United States Patent
Bando et al.

(10) Patent No.: US 9,605,959 B2
(45) Date of Patent: Mar. 28, 2017

(54) DUMP TRUCK

(71) Applicant: HITACHI CONSTRUCTION MACHINERY CO., LTD., Tokyo (JP)

(72) Inventors: Mikio Bando, Tokyo (JP); Takayuki Sato, Tsuchiura (JP); Hidefumi Ishimoto, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 28 days.

(21) Appl. No.: 14/772,909

(22) PCT Filed: Jul. 9, 2014

(86) PCT No.: PCT/JP2014/068284
§ 371 (c)(1),
(2) Date: Sep. 4, 2015

(87) PCT Pub. No.: WO2015/037319
PCT Pub. Date: Mar. 19, 2015

(65) Prior Publication Data
US 2016/0010988 A1     Jan. 14, 2016

(30) Foreign Application Priority Data
Sep. 13, 2013   (JP) ................. 2013-190676

(51) Int. Cl.
*G01C 9/02*     (2006.01)
*G01C 15/00*    (2006.01)
(Continued)

(52) U.S. Cl.
CPC ............. *G01C 9/02* (2013.01); *B60P 1/04* (2013.01); *B60P 1/045* (2013.01); *G01C 5/00* (2013.01); *G01C 15/00* (2013.01)

(58) Field of Classification Search
CPC .. G01C 15/00; G01C 5/00; G01C 9/02; B60P 1/04; B60P 1/045
(Continued)

(56) References Cited

U.S. PATENT DOCUMENTS 6,191,733 B1 *  2/2001   Dizchavez ............ G01S 5/0247
                                                         342/357.57
6,671,587 B2    12/2003  Hrovat et al.
(Continued)

FOREIGN PATENT DOCUMENTS

JP    07-244150 A    9/1995
JP    2002-286829 A  10/2002
(Continued)

OTHER PUBLICATIONS

International Search Report of PCT/JP2014/068284.
(Continued)

*Primary Examiner* — Tyler J Lee
(74) *Attorney, Agent, or Firm* — Mattingly & Malur, PC

(57) ABSTRACT

A dump truck includes a plurality of rear wheels (15) rotatably attached to a frame (11) and two GPS receivers (101, 102) arranged to be dislocated from each other in an anteroposterior direction of a vehicle. Any point selected from an area C, in the vehicle coordinates system B set in the dump truck, where the rear wheels contact a ground is defined as a reference point D. The two GPS receivers are arranged so that a vertical line descends from a line segment PQ, connecting two points P, Q of which positions are calculated by the two GPS receivers, to the reference point D. This makes it possible to accurately estimate an attitude of mining machinery by two position estimation means without stopping operation of the machinery.

8 Claims, 7 Drawing Sheets

(51) Int. Cl.
*B60P 1/04* (2006.01)
*G01C 5/00* (2006.01)
(58) Field of Classification Search
USPC .................................................. 701/32.3, 50
See application file for complete search history.

(56) References Cited

U.S. PATENT DOCUMENTS

| | | | |
|---|---|---|---|
| 7,139,651 B2 * | 11/2006 | Knowlton | E02F 9/2037 |
| | | | 701/23 |
| 7,400,956 B1 | 7/2008 | Feller et al. | |
| 2005/0197755 A1 * | 9/2005 | Knowlton | E02F 9/2037 |
| | | | 701/50 |

FOREIGN PATENT DOCUMENTS

| | | |
|---|---|---|
| JP | 2008-216062 A | 9/2008 |
| JP | 2010-190806 A | 9/2010 |
| JP | 2012-233353 A | 11/2012 |

OTHER PUBLICATIONS

International Preliminary Report on Patentability received in corresponding International Application No. PCT/JP2014/068284 dated Mar. 24, 2016.

* cited by examiner

*FIG. 4*

| LINK ID | 1 | 2 | 3 | ... | n |
|---|---|---|---|---|---|
| LINK STARTING POINT | x11, y11, z11 | x21, y21, z21 | x31, y31, z31 | | xn1, yn1, zn1 |
| LINK ENDING POINT | x12, y12, z12 | x22, y22, z22 | x32, y32, z32 | | xn2, yn2, zn2 |
| CONNECTION ID OF LINK STARTING POINT | 42 | 1 | 2 | | 38 |
| CONNECTION ID OF LINK ENDING POINT | 2 | 3 | 4 | | 52 |
| LINK GRADIENT | 0 | 2 | 5 | | 0 |

401 — LINK ID
402 — LINK STARTING POINT
403 — LINK ENDING POINT
404 — CONNECTION ID OF LINK STARTING POINT
405 — CONNECTION ID OF LINK ENDING POINT
406 — LINK GRADIENT

| TIME SERIES | POSITION OF POINT P | POSITION OF POINT Q |
|---|---|---|
| 0 | P(0) ~704 | Q(0) ~705 |
| 1 | FF: UNIDENTIFIED | Q(1) |
| 2 | P(2) ~706 | FF: UNIDENTIFIED |
| 3 | P(3) | Q(3) ~707 |
| 4 | P(4) | Q(4) |
| ... | ... | ... |

701 702 703

DUMP TRUCK

TECHNICAL FIELD

This invention relates to a dump truck operated at mines and construction sites.

BACKGROUND ART

Attitudes of dump trucks operating at mines and construction sites are expressed by roll, pitch, and yaw angles. If a plane crossing perpendicularly to a gravity direction is defined as a horizontal plane, the pitch angle is an angle that an anteroposterior axis of a dump truck defines with the horizontal plane when rotating around a lateral axis (a side axis) crossing perpendicularly to the anteroposterior axis, and the roll angle is an angle that the lateral axis defines with the horizontal plane when rotating around the anteroposterior axis. An azimuth is the yaw angle that is a rotational angle of the vertical axis crossing perpendicularly to both the anteroposterior axis and the lateral axis.

A well-known technology as described in JP-2012-233353-A, relating to dump trucks, uses two position estimation devices, such as global positioning systems (GPS), to measure the azimuth (yaw angle) of construction machinery, and uses an inertial measurement unit with a combination of a gyro-sensor and an acceleration sensor to estimate roll and pitch angles of the construction machinery. Such a technology thus estimates an attitude of a hydraulic shovel, a type of construction machinery.

JP-2010-190806-A discloses other means for estimating attitudes: a method of estimating attitudes by three position estimation devices on a general moving body.

PRIOR ART DOCUMENTS

Patent Documents

Patent Document 1: JP-2012-233353-A
Patent Document 2: JP-2010-190806-A

SUMMARY OF THE INVENTION

Problems to be Solved by the Invention

The technology of JP-2012-233353-A has an inertial measurement unit estimate an attitude by calculating angular speed during operation of the construction machinery. For this reason, any error in scale factors and biases of the gyro-sensor and an acceleration sensor can cause significant errors in estimated values of roll and pitch angles. To correct such errors, operation of the construction machinery needs to stop or the attitude needs to be estimated by other means.

The technology in JP-2010-190806-A has a dump truck operate under more severe circumstances than ordinary moving bodies, which can cause frequent troubles in sensor devices. The greater number of sensors, or position estimation devices, lead to more frequent necessity of maintenance works. That is, the greater number of sensors contribute to higher introduction cost as well as maintenance cost. Assuming such sensors being used in dump trucks, it is desirable to adopt a method that makes it possible to constantly estimate an attitude in high accuracy with no extra sensors. An attempt to simply estimate attitude of a dump truck with only the two position estimation devices, however, will fail to calculate a rotational angle around a line connecting the two position estimation devices, making it unable to determine the attitude.

It is an object of this invention to provide a dump truck capable of estimating its attitude accurately using two position estimation devices without stopping its operation.

Means for Solving the Problems

The attitude of a dump truck is defined by roll, pitch, and yaw angles around a vehicle body axis with its center of gravity as an origin. Under an assumption that a road has no angle of cant, two position estimation means is set not to be in parallel with the vehicle axis and a contact point that minimizes a rotational error value of the dump truck is set within line segments of the two position estimation means. A gradient calculation unit calculates the gradient of the road and a position of the contact point. Such a unit calculates the attitude of the dump truck based on the contact point position and the position calculated by the two position estimation means.

Advantageous Effect of the Invention

The present invention enables it to estimate an attitude of a dump truck accurately using two position estimation devices.

BRIEF DESCRIPTION OF THE DRAWINGS

FIG. 4 is a data structure of a topological map database of a storage unit 106.

MODES FOR CARRYING OUT THE INVENTION

Figure 1:
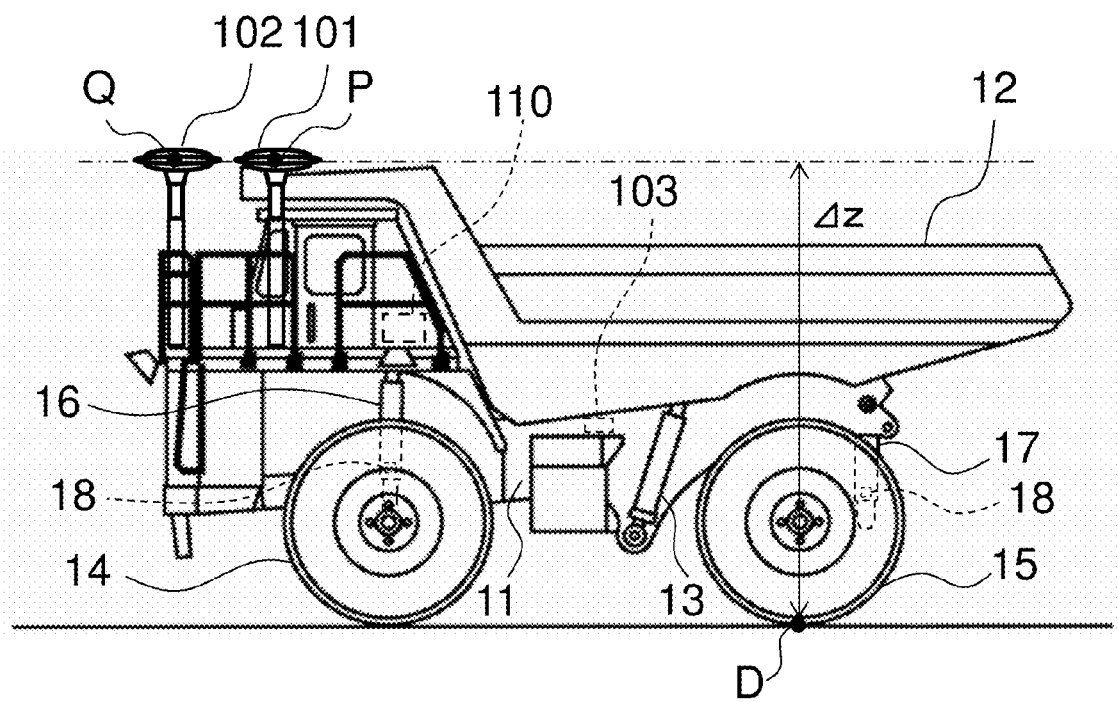
FIG. 1 is a schematic view of a dump truck according to the first embodiment of the present invention.

As described later, a dump truck used in a mine or other sites in the embodiments of the present invention includes a truck vessel attached to a frame so as to be able to ascend and descend, a plurality of rear wheels rotatably attached to the frame, and two position estimation devices (for example, GPS receivers) arranged to be dislocated from each other in an anteroposterior direction of a vehicle. Any point that is in a vehicle coordinate system set in the dump truck and selected from an area where the plurality of rear wheels contact the ground is defined as a reference point D. The two position estimation devices are arranged so that a vertical line descends to the reference point D from a line segment PQ connecting two points P and Q of which positions are calculated by the two position estimation devices.

The inventors of the present invention noticed that the center of gravity of a dump truck was still positioned near a rear wheel shaft, although slightly moving forward or backward in accordance with load weight at a truck vessel. On top of that, the rear wheels were constantly in contact with the ground even though an attitude of the dump truck and the load weight changed. To calculate an attitude of the dump truck, the inventors set a reference point D at an area where the rear wheels contacted the ground (contact surface). They then thought it could be assumed a vertical line (a vertical line descending from the reference point D to the line segment PQ) would oscillate with the reference point D as a fixed end. It is noted that the vertical line was able to rotate around its central axis.

Under such an assumption, the distance from the reference point D to the two points P, Q (scalars of vectors PD, QD) would remain constant if the attitude of the dump truck changes. A position of the reference point D is thus calculated based on the positions of the two points P, Q attained through the two position estimation devices. This calculation determines the position of the reference point D in addition to the positions of the two points P, Q. Determining the positions of these three points P, Q and D allows the attitude of the dump truck to be specified, so that the attitude of the dump truck is estimated accurately using the two position estimation devices.

The attitude of the dump truck may be defined by a roll angle $\phi$, a pitch angle $\theta$, and a yaw angle $\psi$. In such a case, the dump truck would further include an additional sensor for detecting a vehicle height variation at the rear wheels where the reference point D is set. (Such a sensor can be a leveling sensor for detecting variations in suspension length or a pressure sensor for detecting a suspension pressure used for calculating change in load of the truck vessel.) Then, the dump truck would calculate a distance $\Delta z$ from one of the two points P, Q to the ground based on the value the sensor detected. A calculation device, such as a computer, would then calculate the attitude of the dump truck based on the calculated distance $\Delta z$ and the positions of the two points P, Q and the reference point D.

This calculation allows a point T to be set that is ahead by a distance $\Delta z$ from the reference point D toward a normal direction on the ground. A line segment connecting the reference point (the point P or the point Q) of the distance $\Delta z$ to the point T is parallel with the ground. The normal vector U of a plane passing through three points P, Q and T is calculated by a cross product of vectors TQ and TP directed from the point T toward the two points P, Q. Then entering positions of the vector U, the two points P, Q, and the reference point D into an equation described later calculates the roll angle $\phi$, the pitch angle $\theta$, and the yaw angle $\psi$ of the dump truck.

When a coordinate system is set by three axes (the anteroposterior axis, lateral axis, and vertical axis of the dump truck) crossing to each other with a predetermined origin (for example, the center of the dump truck) as a basis in the dump truck, the roll angle $\phi$, the pitch angle $\theta$, and the yaw angle $\psi$ are defined as a rotational angle around each of the three axes in a coordinate system. If the two position estimation devices are dislocated from each other in an anteroposterior direction of the vehicle as described above, the line segment PQ will be out of parallel with any of the three axes. The attitude of the dump truck is accordingly defined by the roll angle $\phi$, the pitch angle $\theta$, and the yaw angle $\psi$.

The dump truck further includes a storage unit for storing gradient information about roads the dump truck travels. The calculation unit preferably calculates the attitude of the dump truck based on the gradient information stored in the storage unit and the positions of the two points P, Q and the reference point D. This enables the attitude to be calculated in view of the gradient of the roads.

The calculation unit of the dump truck preferably calculates the gradient at a point the dump truck is traveling based on past position data of the dump truck, and the attitude of the dump truck based on the gradient information and the positions of the two points and reference point. Even if the gradient information about the road the dump truck is traveling is not stored in the storage unit, the attitude of the dump truck in view of the gradient of road would be calculated.

The reference point D is preferably positioned the nearest to the center of gravity of the dump truck. The attitude of the dump truck changes around the center of gravity. The dump truck, having the reference point set in this way, has a smaller error encountered when the attitude of the dump truck is calculated, thus improving an accuracy of the calculation of the attitude of the dump truck.

The reference point D is preferably extracted from the surface where the rear wheels contact the ground, the rear wheels being the farthest from the line segment PQ connecting the two points P, Q. This maximizes the length of the vertical line from the reference point D to the line segment PQ and makes an error when the attitude of the dump truck is calculated smaller, thus improving the accuracy of the calculation of the attitude of the dump truck.

The two points P, Q and the reference point D are preferably arranged to define an equilateral triangle with the points P, Q, and D as its apexes. This makes the error encountered when the attitude of the dump truck is calculated equally dispersed into the roll angle $\phi$ and the pitch angle $\theta$, thus comprehensively improving the accuracy of the calculation of the attitude of the dump truck.

The two position estimation devices are preferably disposed at the same height in the coordinate system of the vehicle. This makes the calculation of the attitude of the dump truck easier than when the two position estimation devices are set at different heights.

Structures and processes to enable efficient estimation of the attitude of the dump truck of the present invention will now be clearly described with reference to the drawings.

First Embodiment

The first embodiment calculates an attitude of a dump truck while referring to gradient information about roads stored in a storage unit (a topological map database) 106 together with map data indicating the road the dump truck is traveling. For sake of convenience in description of the embodiment, the road the dump truck is traveling has a longitudinal slope but has no lateral gradient. (An angle of cant is zero.)

FIG. 1 is a schematic view of the dump truck of the first embodiment of the present invention. The dump truck in FIG. 1 includes: a frame 11; a truck vessel (body) 12 attached to the frame so as to be able to ascend and descend; a pair of hydraulic cylinders 13 installed through a predetermined space in a transverse direction of the vehicle for use in moving up and down the truck vessel 12; two front wheels 14a, 14b rotatably attached to the front side of the frame 11; four rear wheels 15a, 15b, 15c and 15d rotatably attached to the rear side of the frame; front suspensions 16a, 16b for use in suspending the frame 11 at the front wheels 14a, 14b; rear suspensions 17a, 17b for suspending the frame 11 at the rear wheels 15a, 15b, 15c, and 15d; four leveling sensors 18 for detecting length displacement of the front suspensions 16a, 16b and the rear suspensions 17a, 17b; two GPS receivers (position estimation devices) 101, 102 fixed directly or indirectly to the frame 11; an inertial measurement unit 103 for measuring an acceleration or angular speed of the dump truck; and a computer 110 for executing various processes including calculation of a dump truck attitude. In the following paragraphs, when it is not necessary to explain separately the same kinds of component elements, inferior alphabets added to the reference numbers may be omitted. In addition, the identical or related parts illustrated in the respective figure are shown as the same symbols.

Figure 2:
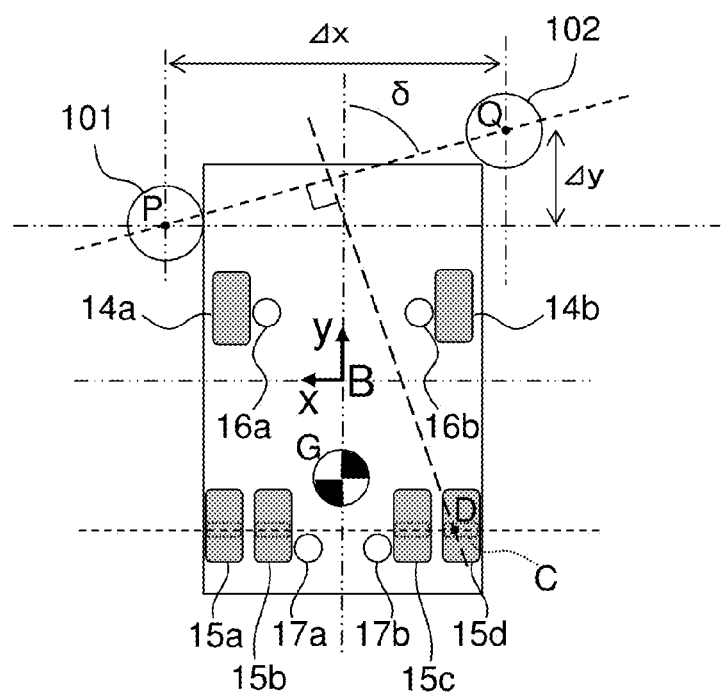
FIG. 2 is a top plan view for schematically showing a structure of the dump truck in FIG. 1.

FIG. 2 is a top plan view for schematically showing a dump truck structure in FIG. 1. As shown in the figure, the dump truck has an origin inside thereof and sets a rectangular coordinate system B having three axes of an anteroposterior axis (y), a lateral axis (x), and a vertical axis (z). (In FIG. 2, the origin of the coordinate system is set at the center of the dump truck.) In the following paragraphs, this coordinate system may be called a vehicle coordinate system B. This coordinate system takes that an angle that the anteroposterior axis (y) defines with a horizontal plane when the dump truck rotates around the lateral axis (x) as a pitch angle θ, and an angle that the lateral axis (x) defines with a horizontal plane when the dump truck rotates around the anteroposterior axis (y) as a roll angle φ. The yaw angle ψ that is a rotational angle around the vertical axis (z) is an azimuth.

In FIG. 2, the two GPS receivers 101, 102 are arranged with space of Δx in-between in a lateral direction (x-axis direction) of the vehicle and dislocated from each other by space of Δy in the anteroposterior direction of the vehicle (y-axis direction). Length Δx may be larger than the vehicle width. The points of which positions are detected by the two GPS receivers 101, 102 are respectively defined as points P, Q. Displacing the two GPS receivers 101, 102 in an anteroposterior direction makes the line segment PQ connecting two points P, Q out of parallel with any of the three axes x, y and z of the vehicle coordinate system B. Accordingly, obtaining the positions of the points P, Q and the reference point D enables the roll angle φ, the pitch angle θ and the yaw angle ψ of the dump truck to be specified.

Navigation signals the GPS receivers 101, 102 receive from a GPS satellite are output regularly to a computer 110 that estimates the positions of the points P and Q based on the navigation signals input from the GPS receivers 101, 102.

As long as the GPS receivers 101, 102 are immovably fixed with relation to the frame 11, a method of fixing is not limited to a particular one. For example, the GPS receivers 101, 102 may be substantially vertically disposed on a beam-like material substantially horizontally protruding from an outer wall of the dump truck.

In this case, an area where each of the four rear wheels 15 in the vehicle coordinate system B contacts the ground is defined as a contact surface C (a surface contacting the ground). In FIG. 2, the contact surface C is an area enclosed by a rectangular dotted line. Since the dump truck of the embodiment has four rear wheels 15, there are four contact surfaces C. Any point selected from the four contact surfaces C is defined as a reference point (contact point) D. In the example in the figure, the reference point D is set on a straight line having a rear wheel shaft projected on the contact surface C of the rear wheel 15d positioned at the right end of the vehicle. Although contours of the contact surfaces C are of a rectangular shape, this is mere schematics of the contact surfaces C and is not intended to limit the contours. The reference point D can be selected randomly from the contact surfaces between actual tires and the ground.

When the reference point D is located on the contact surface C, the positions of the two GPS receivers 101 and 102 are adjusted in such a manner that only one vertical line descends from the reference point D to the line segment PQ. To reduce accuracy of a roll angle or pitch angle when calculating the dump truck attitude, it is preferable to adjust a position of the reference point D in such a manner that the vertical line coming from the reference point D descends onto the line segment PQ.

An angle defined by a vector PQ from the point P to the point Q together with the anteroposterior axis (y) on a plane defined by the anteroposterior axis (y) and the lateral axis (x) in the vehicle coordinate system B (i.e. on a sheet of FIG. 2) is taken as δ.

As shown in FIG. 1, the two GPS receivers 101, 102 according to the present embodiment are disposed to have the points P and Q at the same height. When the two GPS receivers 101, 102 are disposed in this way, the calculation of the dump truck attitude described later is easier than when the two GPS receivers are installed at different heights.

As shown in FIG. 2, the dump truck according to the present embodiment includes two front wheels, i.e., a left side front wheel 14a and a right side front wheel 14b, a front suspension 16a for the left side front wheel 14a, and a front suspension 16b for the right side front wheel 14b. The dump truck further includes four wheels 15a, 15b, 15c, and 15d as the rear wheels. The two rear wheels 15a, 15b are arranged at the left side of the vehicle, and the remaining two rear wheels 15c, 15d are arranged at the right side of the vehicle. The rear suspension 17a is for the left side rear wheels 15a, 15b, and the rear suspension 17b is for the right side rear wheels 15c, 15d.

Symbol G in FIG. 2 indicates the center of gravity of the dump truck. Although the center of gravity G may slightly move in a vertical direction in FIG. 2 along the (y) axis based on load at the truck vessel 12, it is always closer to the rear wheels 15 than to the front wheel 14 though the amount of load at the truck vessel 12 changes. That is, the rear wheels 15 are constantly near the center of gravity G.

Figure 3:
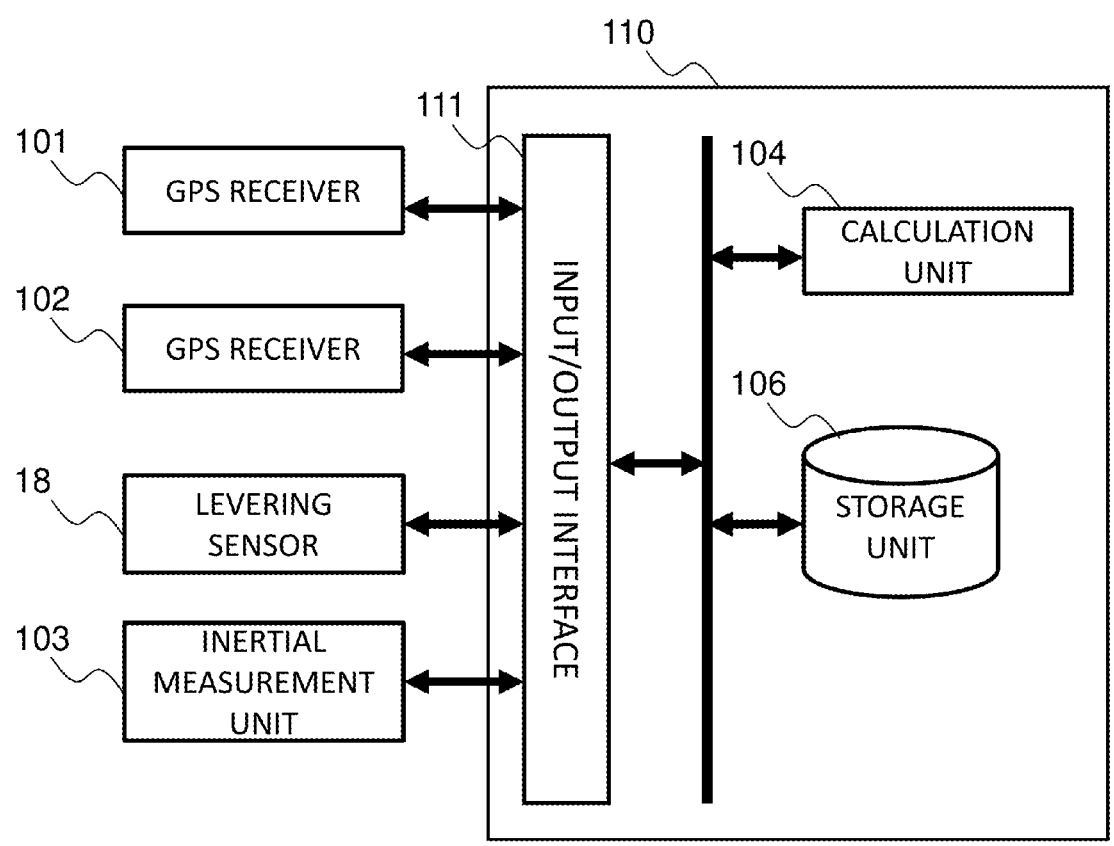
FIG. 3 is a schematic view of a computer 110.

FIG. 3 is a diagram of configuration of the computer 110. As shown in this figure, the computer 110 includes a calculation unit (for example, CPU) 104 acting as calculation means for executing various programs; a storage unit (for example, a semiconductor memory, such as ROM, RAM, and flash memory, or a magnetic storage unit, such as hard disk drive) 106; and an input/output interface 111 for controlling input and output of data and commands, for example, to and from the devices other than the units 104 and 106 in the computer 110 and other units outside the computer 110. The computer 100 may be connected to a display unit (for example, a liquid crystal monitor) for displaying a result of processing (for example, a result of dump truck attitude calculation) of the calculation unit 104.

The computer 110 is connected to the GPS receivers 101, 102, the leveling sensor 18 for detecting a displacement of the rear suspension 17b for the right side rear wheels 15c, 15d, and the inertial measurement unit 103 through the input/output interface 111. Values output from the units 101, 102, 18, and 103 are input to the computer 110.

The storage unit 106 stores maps for indicating shapes and gradients of roads for a dump truck as data (map data). The shapes of the roads are expressed with points (hereinafter referred to as nodes) and lines (hereinafter referred to as links). The storage unit 106 has a topological map database.

FIG. 4 shows a data structure of the topological map database for the storage unit 106. As shown in this figure, the storage unit 106 stores: a link ID 401 individually given to each link (there are "n" number of links in total) constituting the map and uniquely expressing each of the links; a link starting point 402 indicating a coordinate of starting point (node) of the link having a corresponding link ID; a link ending point 403 indicating a coordinate of ending point (node) of the link having a corresponding link ID; a connection ID 404 indicating ID of other link connected to a link starting point having a corresponding link ID; a connection ID 405 indicating ID of other link connected to a link ending point having a corresponding link ID; and a link gradient 406, expressed by angle, indicating gradient of a road that a link having a corresponding link ID shows.

Nodes for the link starting point 402 and the link ending point 403 are indicated by three-dimensional coordinates at a ground coordinate system O (refer to FIGS. 6 and 7) set on the ground (the earth) such as World Geodetic System. Although the link gradient (road gradient) according to the embodiment is defined by an angle defined by a link and a horizontal plane, it may be defined by heights of the two nodes positioned at edges of the link instead.

Figure 5:
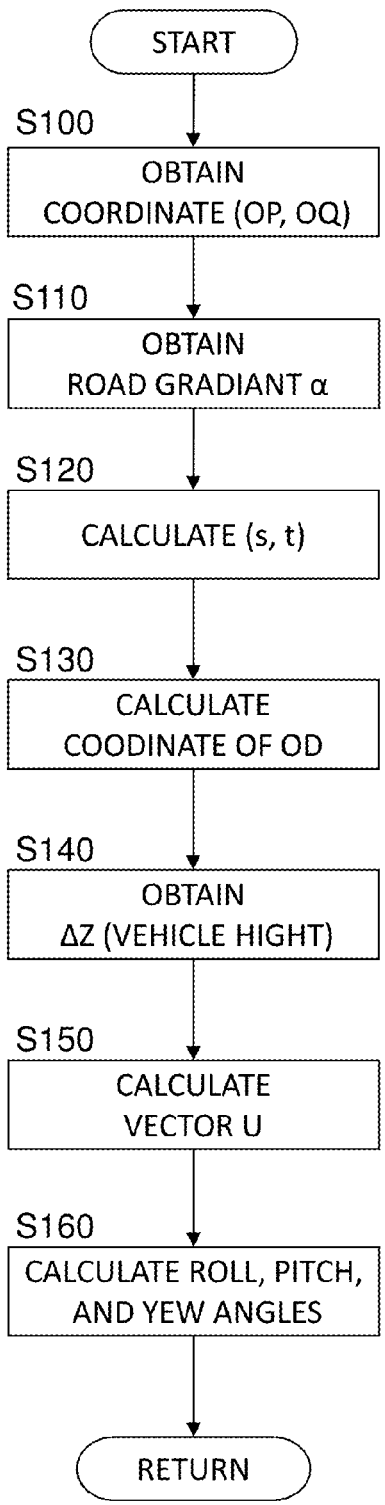
FIG. 5 is a flowchart of calculation of an attitude of a dump truck using the computer 110.
Figure 6:
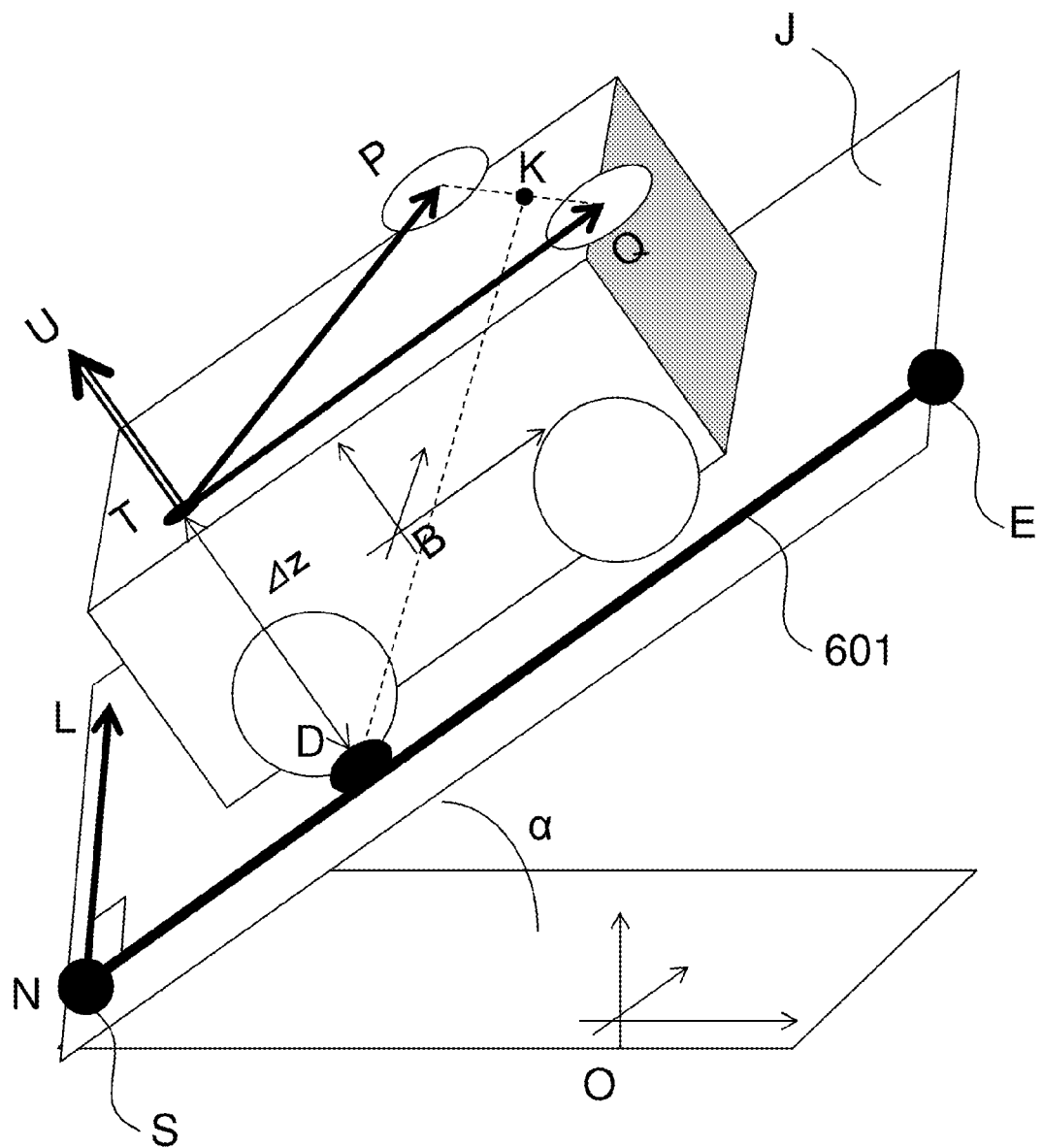
FIG. 6 is a model diagram of the dump truck in FIG. 1.

The calculation of the dump truck attitude using the computer 110 of the dump truck configured as above will now be described. FIG. 5 is a flowchart of the dump truck attitude calculation using the computer 110. FIG. 6 is a drawing modeling the dump truck (a model drawing) in FIG. 1, and in this embodiment, the attitude calculation in FIG. 5 will be described with reference to FIG. 6.

FIG. 6 assumes the coordinate system O as a three-dimensional coordinate system (the ground coordinate system). On top of that, the damp truck is assumed to be traveling on a travel surface J including a link 601. The link 601 is a part of the damp truck road and has an individual link ID, a starting point S, and an ending point E. An angle of inclination (i.e., an angle defined by the horizontal surface and the travel surface J) of the link 601 with respect to the horizontal surface is defined as α.

Symbol Δz indicates the height (distance) from the points P, Q to the travel surface J, and in the example shown in FIG. 6, the reference point (the contact point) D is set as a reference for the ground. The symbol Δz is calculated by detecting change in vehicle height at a position of the rear wheel 15*d* of which reference point is set. In the embodiment, Δz is calculated by adding length of the suspension 17*b* for the rear wheel 15*d* detected by the leveling sensor 18 to height from the top of the suspension 17*b* to the points P, Q (the height is a fixed value). If the heights of the two points P, Q are different, it is only required that a distance from one of the two points P, Q to the travel surface be defined as Δz. In place of the length of the suspension, the amount of load on the truck vessel 12 may be detected by detecting the suspension pressure with the pressure sensor, and Δz may be thus calculated based on change in the load weight.

In FIG. 6 the point T is a point advancing by Δz from the reference point D in the direction of the normal line of the travel surface J. A plane including the two points P, Q and the point T is in parallel with the travel surface J. A normal vector U in the plane is calculated as in equation 1 by a cross product of vectors TQ, TP directing from the point T to the two points P, Q.

Arithmetic 1

$$\vec{U} = \vec{TQ} \times \vec{TP} = \begin{pmatrix} Ux \\ Uy \\ Uz \end{pmatrix}$$ Equation 1

Upon processing in FIG. 5, the computer 110 starts calculating the positions of the points P, Q (vectors OP, OQ) in the ground coordinate system O based on values input from the GPS receivers 101, 102 (step 100).

The computer 110 subsequently specifies the link 601 for the road the dump truck is currently traveling based on the positions of the points P, Q to obtain the starting point, ending point, and gradient α of the link from the storage unit 106. In the embodiment, the point P or Q is assumed to be the position of the own vehicle. The storage unit 106 searches either a link starting point or a link ending point in a predetermined range from the position of the own vehicle and thus obtains all the link IDs associated with either the link starting point or the link ending point. Then, vertical lines are drawn from the own vehicle position to all the links having the obtained IDs, and the link having the shortest vertical line is selected as the link indicating the travel surface the vehicle is currently traveling. The computer 110 eventually obtains the starting point, ending point, and the gradient α of the selected link from the storage unit 106 (step 100).

After obtaining the gradient at step 110, the computer 110 calculates the position of the reference point D based on the positions of the points P, Q acquired at step 100. The position of the reference point D is calculated as follows.

In FIG. 6, a vector SE is defined from the starting point S and the ending point E of the link 601, while a normal direction vector crossing at a right angle with the vector SE on the travel surface J is defined as a vector NL. The vector OD, indicating the position of the reference point D in the ground coordinate system O is on the plane (the travel surface J) containing the vectors SE and NL, is expressed by following equation 2 using unknown variables "s" and "t."

Arithmetic 2

$$\vec{OD} = s\vec{SE} + t\vec{NL}$$ Equation 2

A distance (a scalar of the vector PD) from the point P to the reference point D corresponds to a scalar of difference between the vector OD and the sector OP and is expressed as follows in equation 3 by using equation 2. Similarly, a distance from the point Q to the reference point D (a scalar of the vector QD) is a scalar of difference between the vectors OD and OQ and is expressed as follows in equation 4 by using equation 2.

Arithmetic 3

$$|\vec{PD}| = |\vec{OD} - \vec{OP}| = |s\vec{SE} + t\vec{NL} - \vec{OP}|$$ Equation 3

$$|\vec{QD}| = |\vec{OD} - \vec{OQ}| = |s\vec{SE} + t\vec{NL} - \vec{OQ}|$$ Equation 4

Figure 7:
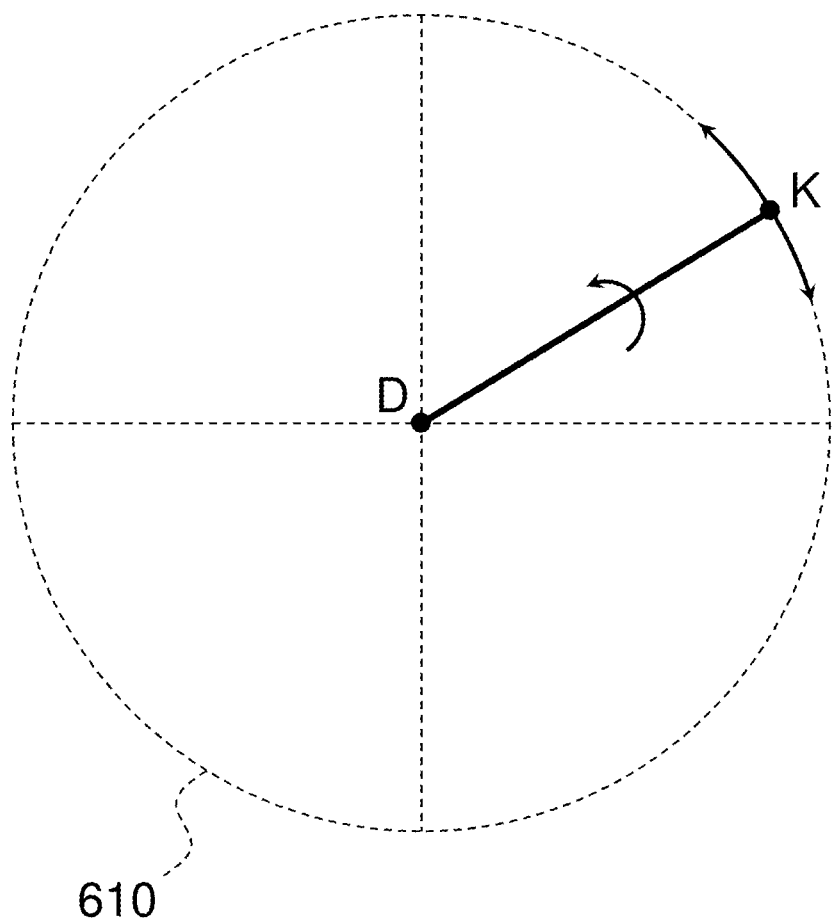
FIG. 7 is a diagram showing a movable range of a line segment DK according to the first embodiment of the present invention.

The present inventors noticed that the center of the gravity G (refer to FIG. 2) of the dump truck, although slightly moving along the anteroposterior axis (y) in accordance with the load weight at the truck vessel 12, was still positioned near the wheel shaft of the rear wheels 15. On top of that, the rear wheels 15 were constantly in contact with the ground even if the attitude or the load weight of the dump truck changed. To calculate the dump truck attitude, the inventors set the reference point D at a contact area where the rear wheels 15 contacted the ground (contact surface C). They then thought it could be assumed a vertical line descending from the reference point D to the line segment PQ would oscillate with the reference point D as a fixed end. In other words, a foot of the vertical line descending from the reference point D to the line segment PQ was defined as K. And it was assumed that, as shown in FIG. 7, if the dump truck attitude changed, the point K would be constantly positioned at the surface of a sphere 610 with the reference point D as the center and the length of the line segment DK as a radius. Moreover, the line segment DK would rotate around its long axis, and the line segment PQ would have an angle with respect to a horizontal plane. Under such an assumption, distances from the reference point D to the two points P, Q (scalars of the vectors PD, QD) would be constant although the dump truck attitude might change, and these distances would be able to be calculated in advance.

As described above, since the scalars of the vectors PD and QD are known values and were obtained at step 100, two sets of "s" and "t" can be calculated based on above two equations 2 and 3 (step 120). Assuming that the dump truck does not overturn, the two sets of "s" and "t" that satisfy following arithmetic 4 will be a solution. In arithmetic 4, "sgn" means a symbol.

$$\begin{pmatrix} Vx \\ Vy \\ Vz \end{pmatrix} = \vec{PQ} \times \vec{PT}, \text{sgn}(Vz) = \text{sgn}(Uz) \quad \text{Arithmetic 4}$$

OD is calculated based on equation 1 and "s" and "t" obtained from above two equations 3 and 4 (step 130). This calculation determines the positions of the three points P, Q, and D, thus calculating an attitude of the dump truck in view of the value a in the event that the road has a gradient.

To specify the dump truck attitude using the roll angle $\phi$, pitch angle $\theta$, and yaw angle $\psi$, the following processing is carried out. The computer 110 detects the length of the suspension 17b for the rear wheel 15d using the leveling sensor 18 and then adds the length to a height (distance) from the upper end of the suspension 17b to the points P, Q to calculate $\Delta z$ and determine the point T (step 140).

The computer 110, as in equation 1, subsequently calculates the normal vector U using a cross product of the two vectors TQ, TP from the point T toward the two points P, Q determined at step 140 (step 150). After the calculation of the vector U, the computer 110 calculates the roll angle $\phi$, pitch angle $\theta$, and yaw angle $\psi$ using the following formulas (step 160).

$$\text{yaw angle } \psi: \begin{pmatrix} Yx \\ Yy \\ Yz \end{pmatrix} = \begin{pmatrix} \cos\delta & -\sin\delta & 0 \\ \sin\delta & \cos\delta & 0 \\ 0 & 0 & 1 \end{pmatrix} \vec{PQ}, \quad \text{Arithmetic 5}$$

$$\psi = \sin^{-1}\left(\frac{Yx}{\sqrt{Yx^2 + Yy^2}}\right)$$

$$\text{pitch angle } \theta: \begin{pmatrix} Px \\ Py \\ Pz \end{pmatrix} = \begin{pmatrix} 1 & 0 & 0 \\ 0 & 0 & -1 \\ 0 & 1 & 0 \end{pmatrix} \begin{pmatrix} \cos\psi & \sin\psi & 0 \\ -\sin\psi & \cos\psi & 0 \\ 0 & 0 & 1 \end{pmatrix} \vec{U},$$

$$\theta = \sin^{-1}\left(\frac{Pz}{\sqrt{Px^2 + Py^2 + Pz^2}}\right)$$

$$\text{roll angle } \varphi: \begin{pmatrix} Rx \\ Ry \\ Rz \end{pmatrix} = \begin{pmatrix} 0 & 0 & -1 \\ 0 & 1 & 0 \\ 1 & 0 & 0 \end{pmatrix} \begin{pmatrix} \cos\psi & \sin\psi & 0 \\ -\sin\psi & \cos\psi & 0 \\ 0 & 0 & 1 \end{pmatrix} \vec{U},$$

$$\varphi = \sin^{-1}\left(\frac{Rz}{\sqrt{Rx^2 + Ry^2 + Rz^2}}\right)$$

That is, in the above formulas, the yaw angle $\psi$ is calculated from the vector PQ, the pitch angle $\theta$ is calculated from the yaw angle $\psi$ and the normal vector U, and the roll angle $\phi$ is calculated from the yaw angle $\psi$ and normal vector U. After the calculations of the roll angle $\phi$, the pitch angle $\theta$, and the yaw angle $\psi$, the operation returns to step 100 to repeat the aforementioned processing.

The start timing of step 100 may be controlled using a timer so as to make a constant interval to start a new attitude calculation after the operation returns to step 100 from step 160. As long as the calculations in FIG. 5 obtain the same calculation result, the order of the calculations can change, or a plurality of calculations can be simultaneously carried out (parallel processes).

Although no special description was made in this embodiment, variations in acceleration or angular speed of the dump truck measured by the inertial measurement unit 103 may be utilized. This will make the position calculation of the points P and Q more accurate and thus improve the accuracy of the calculation of the dump truck attitude.

As described above, the embodiment allows the dump truck attitude to be accurately estimated using the two position estimation devices (GPS receivers 101, 102) only.

Although the present embodiment has described that the road has the gradient $\alpha$ as the example, if the road has zero gradient $\alpha$, the dump truck attitude will be calculated without step 110 in FIG. 5.

Second Embodiment

The second embodiment of the present invention stores time series information about positions of points P, Q obtained through GPS receivers 101, 102 in a storage unit 106, calculates a moving vector of position data based on time series information and a gradient $\alpha$ of a road a dump truck is traveling. Although the second embodiment and the first embodiment are different from the view of data structure of the storage unit 106 and in that a computer 110 calculates the gradient $\alpha$, other configurations including attitude calculation are the same and their descriptions are omitted.

Figures 8, 9:
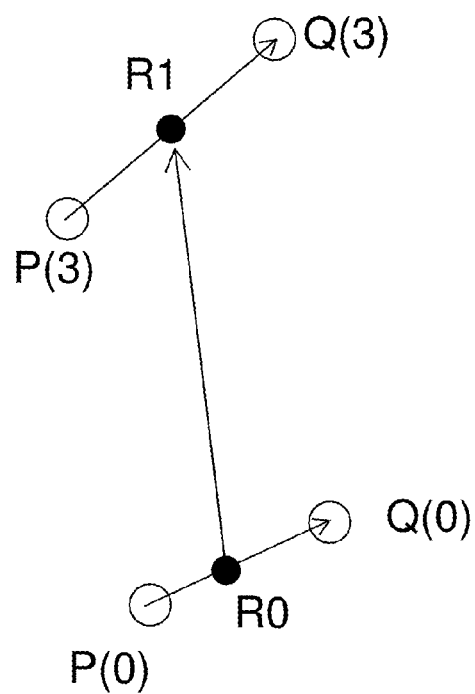
FIG. 8 is a diagram showing a section related to time series information about positions of points P and Q, the section being in the data structure of a storage unit 106 according to the second embodiment of the present invention.
FIG. 9 is a model figure of a result of position estimation of the points P and Q seen from the above.

FIG. 8 is a drawing showing a section related to the time series information about positions of the points P, Q in the data structure of the storage unit 106 according to the second embodiment of the present invention. As in this figure, the storage unit 106 according to the present embodiment stores: time series 701 recording times when the positions of the points P, Q are detected; position series 702 recording positions of the point P at each of the times relating to the time series 701; and position series 703 recording positions of the point Q at each of the times relating to the time series 710. Further, there is also a time when no value is output from the GPS receivers 101, 102. In such a case, a string FF meaning the position of the point P or the point Q was not able to be calculated is input.

In place of step 110 in FIG. 5, how the computer 110 calculates the gradient according to the embodiment will now be described. Upon the gradient calculation, the computer 110 extracts from the storage unit 106 a total of four positions are aligned, the positions including the two points P, Q at the current time and the two points P, Q the predetermined number of samples before from the current time and where outputs of both the points p, Q. For instance, positions 704, 705, 706, and 707 are applicable to this case if the positions of such four points are indicated from the example of FIG. 8.

The four points extracted for the gradient calculation are not necessarily on the same plane. In view of this fact, the computer 110 according to the present embodiment draws first and second line segments by connecting the two points P, Q for the same time out of the extracted four points, draws the third line segment (a moving vector of position data) by connecting a middle point of the first line segment to a middle point of the second line segment, and thus calculates an inclination angle of the third line segment with respect to the horizontal plane as a road gradient. It is assumed that the gradient calculation according to the embodiment is carried out under no angle of cant.

The calculation will now be described with reference to FIG. 9. FIG. 9 is a model figure of a result of position estimation about the points P, Q. FIG. 9 shows four points P(0), Q(0), P(3) and Q(3), wherein P(0) and Q(0) indicate the positions of the points P, Q at the present time and P(3) and Q(3) indicate the positions of the points P, Q three samples before. A middle point of the line segment PQ obtained from the two points P(0) and Q(0) at the present time is defined as R0, while a middle point of the line segment PQ obtained from the two points P(0), Q(0) three samples before is defined as R1. The points R0, R1 and the gradient α [rad] here is calculated using arithmetic 6.

$$\overrightarrow{R(0)R(1)} = \frac{1}{2}\left(\overrightarrow{P(3)Q(3)} - \overrightarrow{P(0)Q(0)}\right)$$

$$\vec{R} = \overrightarrow{R(0)R(1)} = \begin{pmatrix} R_1 \\ R_2 \\ R_3 \end{pmatrix}$$

$$\alpha = \arccos\left(\frac{R_3}{|\vec{R}|}\right)$$

Arithmetic 6

The computer 110 according to the present embodiment can calculate the gradient α at the position the dump truck is traveling based on the present and past position data of the points P, Q. The computer 110 can thus calculate the dump truck attitude based on the gradient α and the present positions of the three points P, Q and D. This allows the dump truck attitude to be calculated including the road gradient, although the gradient information about the dump truck road may not be included in the map data (for example, in the case that the gradient is not measured when the map data is made).

When Δz (vehicle height) is calculated, the leveling sensor 18 for detecting the length of the rear suspension 17b is used in the above example. However, Δz can be estimated based on the load weight after the load weight at the truck vessel 12 is estimated by using a pressure sensor to detect the pressure of the fluid (hydraulic pressure) in the suspension 17b.

Moreover, the GPS receivers 101, 102 are used to estimate the position of the dump truck in the above. Its position may be estimated in the following manner: a receiver for receiving navigation signals from other satellites is similarly installed in the dump truck; and another satellite measuring system that measures attitudes based on the navigation signals are set up.

In the case that minute attitude changes are detected, the vertical line descending from the point D to the line segment PQ is preferably as long as possible. For this reason, the reference point D is preferably positioned the farthest from the line segment PQ. That is, in example shown in FIG. 2, it is preferable that the reference point is located at the apex in the bottom right in the contact surface C of the rear wheel 15d.

Moreover, although the reference point D is set at the contact surface C of the right end rear wheel 15d in the above example, a possible error encountered when the dump truck attitude is calculated should be as small as possible. To achieve this, it is preferable that the reference point D is the nearest to the center of gravity G on the contact surface C of the two wheels 15b, 15c that are closer to the center of gravity G (refer to FIG. 2) of the dump truck than the other rear wheels. Setting the reference point D in this way enables the reference point D to approach the center of gravity G serving as the center of oscillation of the dump truck, allows calculation to be carried out in a state similar to actual operation of the dump truck, and thus reduces such an error as above.

The two points P, Q and the reference point D are preferably arranged so as to define an equilateral triangle with the points P, Q, and D as apexes. That is, it is preferable to position the points in such a way that the line segments PQ, QD and DP have the same length. This equally disperses a possible error encountered when the dump truck attitude is calculated to the roll angle φ and the pitch angle θ, and thus improves accuracy in calculation of the dump truck attitude.

Although the computer 110 mounted on the dump truck calculates the dump truck attitude in the above example, a different computer may be used which controls a plurality of dump trucks that autonomously travel and is installed at a such building as a navigation control center. Such a computer then inputs the positions of the points P, Q from the dump truck through a wireless communication device or other devices before the calculation of the attitude.

While several embodiments of the present invention have been described, the embodiments have only been presented by way of example and are not intended to limit the scope of the invention. These and other novel embodiments may be implemented in various other forms, and part of the subject matter of these embodiments may be omitted, replaced, and/or changed or modified in various forms without departing from the scope of the invention. These embodiments and modifications thereof are embraced in the scope and gist of the invention, the embodiments and the modifications thereof also being embraced in the scope of the invention described in the appended claims. In addition, the embodiments and the modifications thereof come within the meaning and range of equivalency of the invention. Furthermore, these embodiments can also be at least partly combined, as appropriate, within the scope of the gist of the invention.

Note also that some or all of the structures, functions, processors, and the like relating to the computer can be implemented by hardware. For example, the logic that executes each function may be designed by an integrated circuit. Alternatively, the computer can be configured to have programs (software) that achieve each function relating to the structures of the control unit by being read and executed by an arithmetic unit, such as CPU. Data associated with the programs can be stored, for example, on a semiconductor memory (such as a flash memory and a solid state drive), a magnetic storage device (such as a hard disk drive) or a storage medium (such as a magnetic disk and an optical disc).

Further note that the control lines and information lines shown above represent only those lines necessary to illustrate the present invention, not necessarily representing all the lines required in terms of products. Thus, it can be assumed that almost all the components are in fact interconnected.

REFERENCE SIGNS LIST

11: Frame
15: Rear wheels
17: Rear suspension
18: Leveling sensor
101: GPS receiver
102: GPS receiver
103: Inertial measurement unit
106: Storage unit
110: Computer
P: Position of point calculated by GPS receiver 101
Q: Position of point calculated by GPS receiver 102
C: Contact surface
D: Reference point
Δz: Height (distance) from points P and Q to reference point D
G: Center of gravity of dump truck

The invention claimed is:

1. A dump truck comprising:
a plurality of rear wheels rotatably attached to a frame;
two position estimation devices disposed to be dislocated from each other in both an anteroposterior direction and a lateral direction of the dump truck, and that calculate positions of two points corresponding to the two position estimation devices, and, when any point in a vehicle coordinates system set at the dump truck is selected from areas where the rear wheels contact a ground is defined as a reference point, the two position estimation devices are disposed so that the reference point is normal to a line segment connecting the two points corresponding to the two position estimation devices; and
a processor programmed to, under an assumption that an attitude changes when the dump truck rotates around the reference point, calculate a position of the reference point based on the positions of the two points calculated by the two position estimation devices and to calculate the attitude of the dump truck based on the two points and the reference point.

2. The dump truck according to claim 1, further comprising:
a sensor for detecting a change in a vehicle height at the rear wheel where the reference point is located,
wherein the processor is further programmed to calculate, based on a detected value of the sensor, a distance to the ground from at least one of the two points of the positions calculated by the two position estimation devices and to calculate the attitude of the dump truck based on the calculated distance to the ground, the positions of the two points and the reference point.

3. The dump truck according to claim 2, wherein the reference point is located at a position nearest to a center of gravity of the dump truck.

4. The dump truck according to claim 2, further comprising:
a storage unit storing gradient information about a road the dump truck travels,
wherein the processor is further programmed to calculate the attitude of the dump truck based on the gradient information, the positions of the two points and the reference point.

5. The dump truck according to claim 2,
wherein the processor is further programmed to calculate a gradient at a point where the dump truck is traveling based on past position data of the dump truck and to calculate the attitude of the dump truck based on the calculated gradient information, the positions of the two points and the reference point.

6. The dump truck according to claim 1, wherein the reference point is selected from the area of one of the rear wheels located farthest from the line segment connecting the two points corresponding to the two position estimation devices.

7. The dump truck according to claim 1, wherein a triangle having apexes defined by the two points corresponding to the two position estimation devices and the reference point is an equilateral triangle.

8. The dump truck according to claim 1, wherein the two position estimation devices are disposed at a same height in the vehicle coordinates system.

* * * * *